3,509,489

LASER DEFLECTION

Filed April 13, 1967

INVENTORS
GERALD BURNS
ARCHIBALD W. SMITH

BY *George Baron*

ATTORNEY

United States Patent Office 3,509,489
Patented Apr. 28, 1970

3,509,489
LASER DEFLECTION
Gerald Burns, Yorktown Heights, and Archibald W. Smith, Briarcliff Manor, N.Y., assignors to International Business Machines Corporation, Armonk, N.Y., a corporation of New York
Filed Apr. 13, 1967, Ser. No. 630,649
Int. Cl. H01s 3/00; G02f 1/32
U.S. Cl. 331—94.5                    5 Claims

ABSTRACT OF THE DISCLOSURE

A system is disclosed for deflecting a laser beam within a laser cavity employing the Bragg-angle diffraction effect. The diffraction of the lasing light occurs when an ultrasonic wave is made to traverse a piezoelectric crystal or cell and the lasing light passes through the cell at the Bragg angle with respect to the traveling ultrasonic waves. However, changes of frequency, especially at very high frequencies, of such ultrasonic wave will cause a shift in frequency of the light being diffracted by such traveling ultrasonic wave, causing light to leave the laser cavity modes. A folded cavity arrangement is also provided to avoid such optical frequency shift.

CROSS-REFERENCE TO RELATED APPLICATION

An application filed on Nov. 27, 1966 in the name of Robert V. Pole, Ser. No. 414,120, and entitled "Laser Emission Control Employing Light Diffraction," and assigned to the same assignee as the instant application discloses and claims an invention for scanning a laser beam by setting up a diffraction grating within the cavity to control the direction of laser emission. In such Pole application, an angularly degenerate laser cavity is employed, having a center of summetry and a plurality of radially disposed resonant paths of oscillation diverging from the center of symmetry. An ultrasonic cell is placed at the center of the cavity where it acts as a phase diffraction grating forming a diffraction pattern at the outer surfaces of the cavity. The diffraction pattern includes a plurality of orders of different intensity.

BACKGROUND OF THE INVENTION

The present invention also employs an angularly degenerate laser cavity having an ultrasonic medium located within the laser cavity. However, the geometry of the cavity is selected so that when a traveling ultrasonic wave traverses the ultrasonic medium, such wave diffracts any lasing light within the cavity at the Bragg angle. A distinct advantage of the Bragg angle diffraction is that potentially all the light can be diffracted into a single beam. Additionally, the present invention differs from said commonly assigned application by Pole in providing a folded laser cavity. In using a traveling wave ultrasonic diffraction scheme, the optical frequency of the lasing light is shifted when the latter is diffracted. Such frequency shift will result in lasing light being removed from the axial modes of the cavity, resulting in loss of intensity of the scanning beam. To avoid such optical frequency shift, a folded laser cavity, containing a plane mirror, is employed to make the diffracted laser light pass twice through the ultrasonic beam, the second pass entering the ultrasonic medium at an angle that is equal and opposite to the first pass through the medium. Such an arrangement cancels out the potential frequency shift.

Consequently, it is an object of the present invention to provide an improved apparatus for controlling the emission of a laser beam.

It is another object of the present invention to provide an apparatus for scanning a laser beam internally of the laser cavity.

A further object is to obtain scanning of a laser beam employing the Bragg angle effect.

Yet another object is to obtain a scanning of a laser beam internal to the laser cavity without causing an optical frequency shift of the resulting laser beam.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
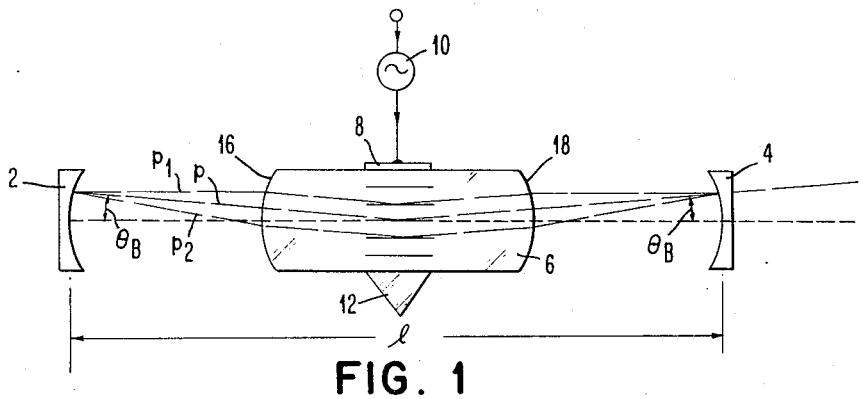
FIG. 1 is an embodiment of the invention.

Spherical mirrors 2 and 4 provide the ends of the optical cavity of a laser in which a crystal 6, which is a good laser host and has low ultrasonic absorption, is the active medium. It is understood that the mirrors 2 and 4 and the active medium 6 are placed in a conventional laser housing. Some features are not shown in that they do not contribute to the understanding of the invention.

A transducer element 8, such as zinc oxide or cadmium sulphide, is cemented vapor deposited, or otherwise affixed to the active medium 6. A generator of high frequency electrical fields 10 is connected to transducer 8. On the other side of crystal 6 is an ultrasonic absorbing medium 12. Such medium could be an absorbing glass or any similar material that absorbs ultrasonic waves very readily. The triangle shape aids in causing reflections of sound in a direction other than back through the crystal 6. Of course, one does not have to employ an active medium that is also the carrier of the ultrasonic wave. It will be understood by those skilled in the art that separate elements suitably disposed within the laser cavity can be employed. Representative ultrasonic media are fused quartz and water.

In order to scan any of the modes that might occur in the lasing cavity, a high frequency signal from source 10 is applied to transducer 8, the latter transforming the high frequency electrical field to a high frequency ultrasonic beam. Such high frequency acoustical waves traverse the crystal 6 and are absorbed by the ultrasonic absorber 12. Such excursions from the transducer to the absorber through the active medium are repeated while said generator 10 continues to apply an electrical field to transducer 8.

It is known that when a light beam is incident at the Bragg angle $\theta_B$ on an ultrasonic beam, sufficient ultrasonic strain can be obtained from transducer 8, due to energy derived from oscillator 10, to diffract most of the light at an angle equal to but opposite that of the Bragg angle. The Bragg angle $\theta_B$ is a function of the optical wavelength $\lambda$ and the ultrasonic frequency $f$ and velocity $V_1$. The relationship can be represented by the formula $\sin \theta_B = \lambda f / 2V_1$. The Bragg angle effect can now be used to control the direction of lasing in an angularly degenerate laser cavity by varying the ultrasonic frequency $f$. In fact, because the angle $\theta_B$ is known once $\lambda$, $f$ and $V_1$ are selected, the height of mirrors 2 and 4 can be made sufficiently small to support lasing only within this angle.

The frequency of the oscillator 10 is selected such that the resulting acoustical wave through the crystal 6 will destroy all modes in the degenerate cavity but one. That mode will be determined by the relationship discussed above. As is seen in FIG. 1, $\theta_B$ is the Bragg angle at a given ultrasonic velocity $V_1$. The optical rays $p$, $p_1$, $p_2$ impinge upon the ultrasonic beam traversing the crystal 6. That lasing mode which is incident at the Bragg angle for the ultrasonic waves in the crystal 6 will be reflected from such waves at the same Bragg angle and impinge upon the opposite mirror in the lasing cavity. The employment of the Bragg angle effect in the lasing cavity is a scanning device wherein substantially all of the light energy in the cavity is employed in a single scanning beam. The crystal 6 employs curved surfaces 16 and 18 so as to aid in focusing any laser light in the cavity onto the spherical mirrors 2 and 4. One of the mirrors, for example mirror 2, is made partially transmitting to the laser beam generated in the cavity. Many active media can be employed in the practice of this invention. For example, ruby or neodymium doped yttrium aluminum garnet are two crystals that are particularly suitable because they can be made to lase and can also support ultrasonic waves with low attenuation. A suitably doped LiNbO$_3$ crystal is another alternative in that it is not only a laser medium, but the crystal is piezoelectric and can convert an electric field to an acoustic wave. Thus, for crystals that are, like LiNbO$_3$, piezoelectric, a transducer 8 is not needed.

If one uses a laser beam about 0.5 cm. in diameter, its divergence will be approximately $2 \times 10^{-4}$ radian. In order to obtain 500 resolvable spots during a scan, a change in deflection of about 0.1 radian is needed, or about 5.7°. For such a change in deflection, the ultrasonic frequency must be swept up to 1.4 gigacycles. Under certain operating conditions, the ultrasonic frequency can be swept from 2 to 3.4 gigacycles. The scanning rate will be limited by the time taken for the acoustic waves to cross the optical beam, which is about $10^{-6}$ sec. Where two dimensional scanning is desired, two mutually perpendicular ultrasonic beams are transmitted in the acoustical medium 6. The optical frequency $f_0$ of the laser beam, represented by the rays $p$, $p_1$, $p_2$, is determined by the resonant frequency of the laser cavity. It has been observed that when a beam of laser light is diffracted at the Bragg angle due to the presence of a traveling ultrasonic wave through crystal 6, there is a shift in this optical frequency $f_0$. This shift, which is equal to the ultrasonic frequency $f$, will result in light being removed from the lasing modes. Such cavity losses that are introduced will depend on the ultrasonic frequency and, as the ultrasonic frequency is changed to effect scanning, the intensity of the scanned beam will diminish.

Figure 2:
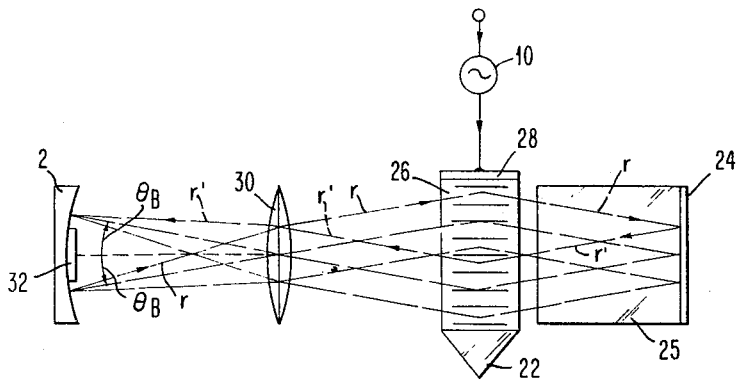
FIG. 2 is a modification of the embodiment shown in FIG. 1.

To avoid such optical frequency shift, the invention of FIG. 1 is modified as shown in FIG. 2. The active medium 25, which could be a suitably doped solid state medium such as ruby or a gas, has a plane mirror 24 employed as one end of the optical cavity in which lasing occurs. Such active medium 25 is optically pumped by a suitable lamp source, not shown, in a manner well known in the lasing art. Adjacent the active medium 25 is an ultrasonic medium 26, similar to ultrasonic medium 6 of FIG. 1, the latter having associated therewith a transducer 28 and ultrasonic absorber 22. A lens 30 focuses the diffracted rays $r$ onto mirror 2. The height of mirror 2 has been selected so that lasing occurs substantially only at the Bragg angle $\theta_B$. Since the velocity of light in the cavity is $\gg$ than the velocity of the ultrasonic wave in medium 26, a given light ray $r$ passes twice through a node of the ultrasonic beam in the acoustic medium 26. For example, ray $r$ is diffracted at the Bragg angle $\theta_B$ in medium 26, enters the laser medium 25 and is reflected from mirror 24 as ray $r'$, back through medium 26 at the Bragg angle $-\theta_B$ and back through lens 30 onto mirror 2. This "folding" over of the laser cavity has the effect of cancelling out the above noted optical frequency shift that could take place when the active medium is located centrally of the laser cavity and the laser beam is diffracted by the ultrasonic wave traversing the medium 26.

An aperture stop 32 is made of a non-reflective material inserted on the face of mirror 2 to prevent a non-diffracted beam from lasing and thus more easily limit lasing action to the Bragg angle.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for controlling the direction of emission of a laser in an angularly degenerate cavity containing a plurality of differently disposed resonant paths, said angularly degenerate cavity having a given axis, comprising:
    means for transmitting an ultrasonic beam within said cavity, said ultrasonic beam propagating substantially at right angles to said given axis but at different angles to said plurality of resonant paths, and
    means for employing said ultrasonic beam to diffract a single resonant path at the Bragg angle.

2. Apparatus for controlling the direction of emission of a laser in an angularly degenerate cavity containing a plurality of differently disposed resonant paths, comprising:
    a crystal disposed in said cavity and having a transducer attached thereto, said crystal transmitting an ultrasonic beam in response to an electric field applied to said transducer,
    said crystal also serving as a host for dopants that can be pumped so as to provide a laser active medium in said cavity,
    means for initiating lasing action in said cavity whereby a lasing mode is established by the diffraction of light within said cavity from said ultrasonic beam,
    said light being diffracted by said ultrasonic beam at the Bragg angle $\theta_B$ and in accordance with the relationship $$\sin \theta_B = \frac{\lambda f}{2V_1}$$

where $\lambda$ is the optical wavelength of said diffracted light, $f$ is the ultrasonic frequency and $V_1$ is the ultrasonic velocity.

3. The apparatus of claim 2 wherein means are provided to vary the frequency of said electric field so as to obtain a scanning of said diffracted light.

4. A system for scanning a laser beam comprising:
    an optical cavity including a pair of facing mirrors at the ends of said cavity and forming an angularly degenerate cavity,
    an active medium in said cavity for lasing when pumped,
    means for transmitting an ultrasonic beam disposed in said cavity adjacent said active medium,
    variable frequency means coupled to said means for transmitting for initiating and modifying the passage of said ultrasonic beam through said transmitting means,
    said mirrors being of a size to support lasing within said cavity only over the range of Bragg angles created by changes in said frequency.

5. A system for scanning a laser comprising:
an optical cavity comprising two end mirrors,
a means for transmitting an ultrasonic beam within said cavity,
an active medium within said cavity adjacent said transmitting means for producing a laser mode within said cavity, an ultrasonic medium within said cavity,
means for causing said laser mode to diffract at the Bragg angle from said ultrasonic beam within said ultrasonic medium twice during one passage of said mode from a first end mirror to the second mirror and back again to said first end mirror, said diffractions being equal and opposite.

References Cited

UNITED STATES PATENTS

| 3,174,044 | 3/1965 | Tien. | |
|---|---|---|---|
| 3,297,876 | 1/1967 | De Maria | 250—199 |
| 3,432,221 | 3/1969 | Harris et al. | 331—94.5 X |

RONALD L. WIBERT, Primary Examiner

P. K. GODWIN, Jr., Assistant Examiner

U.S. Cl. X.R.

330—5.5; 350—161